United States Patent
Mathai et al.

(10) Patent No.: US 11,041,422 B2
(45) Date of Patent: Jun. 22, 2021

(54) SYSTEMS AND METHODS FOR WARMING A CATALYST IN A COMBINED CYCLE SYSTEM

(71) Applicant: General Electric Company, Schenectady, NY (US)

(72) Inventors: George Vargese Mathai, Atlanta, GA (US); Alexander James Pistner, Atlanta, GA (US); Joseph Philip Klosinski, Atlanta, GA (US); Jeremy Andrew Williams, Jupiter, FL (US); Timothy Vincent Weiser, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 419 days.

(21) Appl. No.: 15/877,592

(22) Filed: Jan. 23, 2018

(65) Prior Publication Data
US 2019/0226374 A1 Jul. 25, 2019

(51) Int. Cl.
| | | |
|---|---|---|
| *F01N 3/20* | (2006.01) | |
| *F01K 23/10* | (2006.01) | |
| *F02C 6/18* | (2006.01) | |
| *F01N 3/10* | (2006.01) | |
| *F01K 23/16* | (2006.01) | |

(52) U.S. Cl.
CPC ............. *F01N 3/208* (2013.01); *F01K 23/10* (2013.01); *F01K 23/16* (2013.01); *F01N 3/106* (2013.01); *F02C 6/18* (2013.01); *F01N 2610/02* (2013.01); *F01N 2900/1602* (2013.01)

(58) Field of Classification Search
CPC ...... F02C 6/00; F02C 6/02; F02C 6/08; F02C 6/18; F01K 23/10; F01N 3/22; F01N 3/2006; F01N 3/2066; F01N 2910/02; F01N 3/208
See application file for complete search history.

(56) References Cited

U.S. PATENT DOCUMENTS

| | | |
|---|---|---|
| 5,473,898 A | 12/1995 | Briesch |
| 6,095,793 A | 8/2000 | Greeb |
| 7,107,774 B2 * | 9/2006 | Radovich ................ F01K 13/02 122/7 B |
| 2004/0160061 A1 | 8/2004 | Rouse et al. |
| 2006/0016195 A1 | 1/2006 | Dalla Betta et al. |

(Continued)

OTHER PUBLICATIONS

Miller, Bruce G., "Emission Control Strageties for Power Plants", 2011, p. 1-2. (Year: 2011).*

*Primary Examiner* — Todd E Manahan
*Assistant Examiner* — Thuyhang N Nguyen
(74) *Attorney, Agent, or Firm* — Eversheds Sutherland (US) LLP

(57) ABSTRACT

The present application provides a combined cycle system. The combined cycle system may include a number of gas turbine engines, a number of heat recovery steam generators with a selective catalyst reduction and/or oxidation catalyst system, and a catalyst heating system. The catalyst heating system directs an extraction from a first gas turbine engine of the number of gas turbine engines to the selective catalyst reduction and/or oxidation catalyst system of a second heat recovery steam generator of the number of heat recovery steam generators.

19 Claims, 1 Drawing Sheet

(56) References Cited

U.S. PATENT DOCUMENTS

| | | | |
|---|---|---|---|
| 2013/0104519 A1* | 5/2013 | Zhang | B01D 53/76 |
| | | | 60/39.182 |
| 2015/0345401 A1 | 12/2015 | Ekanayake et al. | |
| 2016/0115839 A1* | 4/2016 | Abrol | B01D 53/8625 |
| | | | 60/776 |
| 2016/0131046 A1 | 5/2016 | Leone et al. | |
| 2016/0273398 A1* | 9/2016 | Ekanayake | F02C 6/08 |
| 2016/0273401 A1 | 9/2016 | Ekanayake et al. | |
| 2017/0037780 A1 | 2/2017 | Klosinski et al. | |
| 2017/0167379 A1 | 6/2017 | Scipio et al. | |
| 2017/0342903 A1 | 11/2017 | Scipio et al. | |
| 2018/0163626 A1* | 6/2018 | Kraft | F01K 21/04 |

* cited by examiner

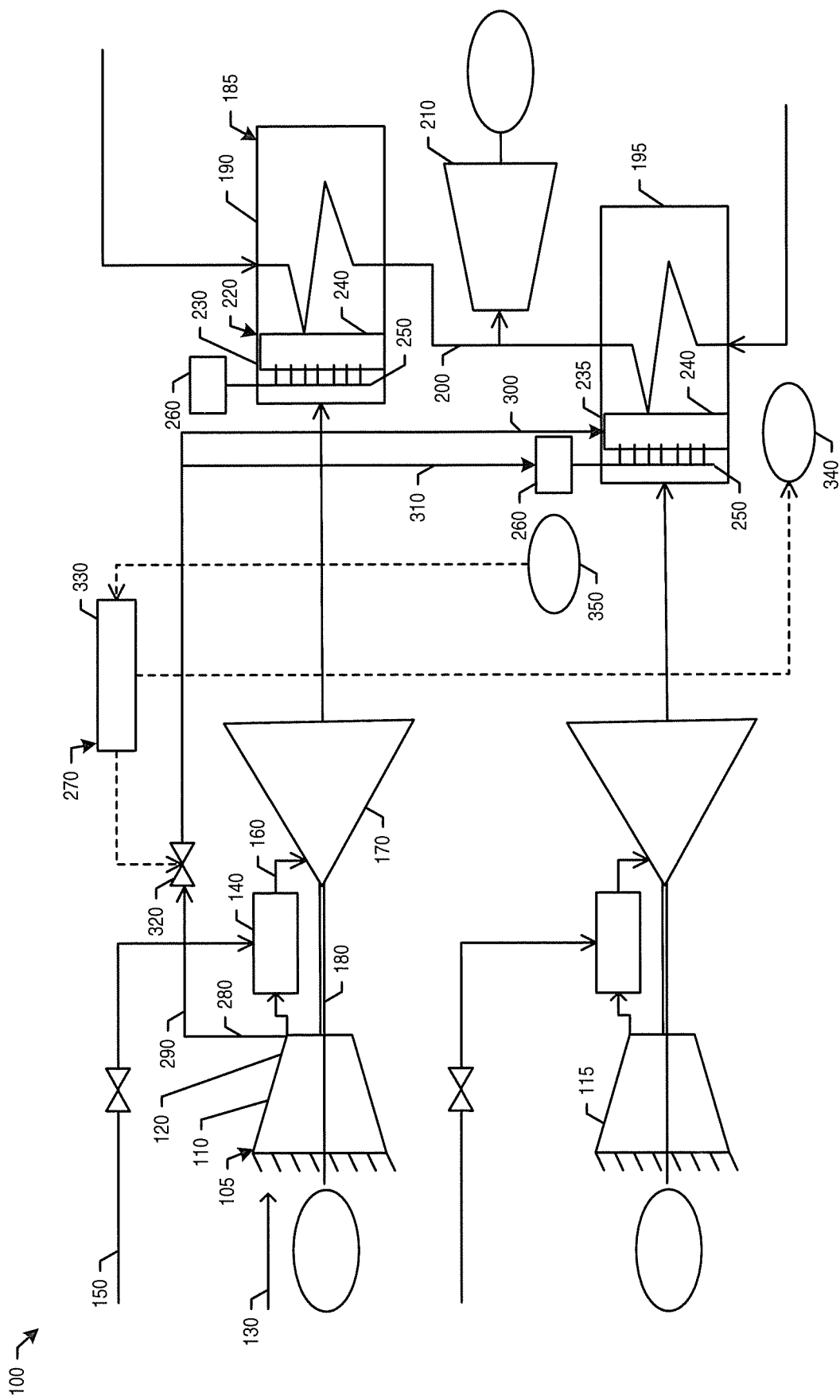

SYSTEMS AND METHODS FOR WARMING A CATALYST IN A COMBINED CYCLE SYSTEM

TECHNICAL FIELD

The present application and the resultant patent relate generally to turbomachinery and more particularly relate to a catalyst heating system using compressor air extractions from a gas turbine engine to warm the catalyst in a selective catalyst reduction and/or oxidation catalyst system positioned about an adjacent heat recovery steam generator in a combined cycle system.

BACKGROUND OF THE INVENTION

A power generation plant such as a combined cycle power generation system generally includes a gas turbine engine, a heat recovery steam generator, and a steam turbine. The gas turbine engine may be coupled with a generator to produce electricity or to drive other types of loads. The hot combustion gases from the gas turbine engine may be introduced into the heat recovery steam generator to generate a flow of steam. The flow of steam in turn may drive the steam turbine. The steam turbine also may be coupled to a generator to produce additional electricity. A co-generation power generation system and the like may operate in a similar manner to produce both electricity and steam.

In the combustion process, nitrous oxide (NOx), carbon monoxide (CO), and other types of regulated emissions are produced. Specifically, the gas turbine emits hot flue gases that contain levels of nitrous oxide and carbon monoxide that may be higher than acceptable permit limitations. One solution for reducing the overall emissions levels is the use of a selective catalyst reduction system for nitrous oxide and an oxidation catalyst system for carbon monoxide. Generally described, the selective catalyst reduction system adds a reductant, typically ammonia or urea, to the hot combustion gas stream before passing the combustion gas stream through a catalyst bed so as to absorb selectively the nitrous oxide and the reducing agent. The absorbed components undergo a chemical reaction on the catalyst surface and the reaction products are desorbed. Specifically, the reactant reacts with the nitrous oxide in the combustion gas stream to form water and nitrogen. Similarly, the oxidation catalyst system promotes the reaction of carbon monoxide in the combustion stream to form carbon. Other types of catalysts and other types of reductants may be used.

The overall efficiency of the selective catalyst reduction and oxidation systems may depend at least in part on the temperature of the hot combustion gas stream. Specifically, the efficient temperature range of the selective catalyst reduction and oxidation catalyst system may be relatively narrow. Excessive emissions thus may be a concern during, for example, gas turbine engine start up and shut down.

SUMMARY OF THE INVENTION

The present application and the resultant patent thus provide a combined cycle system. The combined cycle system may include a number of gas turbine engines, a number of heat recovery steam generators with a selective catalyst reduction and/or oxidation catalyst system, and a catalyst heating system. The catalyst heating system directs an extraction from a first gas turbine engine of the number of gas turbine engines to the selective catalyst reduction and/or oxidation catalyst system of a second heat recovery steam generator of the number of heat recovery steam generators.

The present application and the resultant patent further provide a method of warming a catalyst in a selective catalyst reduction and/or oxidation catalyst system of a combined cycle system. The method may include the steps of compressing a flow of air in a compressor of a first gas turbine engine, flowing combustion gases from the first gas turbine engine through a first selective catalyst reduction and/or oxidation catalyst system associated with a first heat recovery steam generator, flowing further combustion gases from a second gas turbine engine through a second selective catalyst reduction and/or oxidation catalyst system associated with a second heat recovery steam generator, and extracting a portion of the flow of air from the compressor of the first gas turbine engine to the second selective catalyst reduction and/or oxidation catalyst system.

The present application and the resultant patent further provide a combined cycle system. The combined cycle system may include a number of gas turbine engines, a number of heat recovery steam generators with a selective catalyst reduction system having a catalyst and an ammonia injection grid, and a catalyst heating system. The catalyst heating system directs an extraction from a first gas turbine engine of the number of gas turbine engines to the catalyst and the ammonia injection grid of a second heat recovery steam generator of the number of heat recovery steam generators.

These and other features and improvements of the present application and the resultant patent will become apparent to one of ordinary skill in the art upon review of the following detailed description when taken in conjunction with the several drawings and the appended claims.

BRIEF DESCRIPTION OF THE DRAWINGS

FIG. 1 is a schematic diagram of a combined cycle system with a catalyst heating system as may be described herein.

DETAILED DESCRIPTION

Referring now to the drawings, in which like numerals refer to like elements, FIG. 1 shows a schematic diagram of a combined cycle system 100 as may be described herein. The combined cycle power 100 may include one or more gas turbine engines 105. In this example, a first gas turbine engine 110 and a second gas turbine engine 115 are shown although any number may be used. Each gas turbine engine 105 includes a compressor 120. The compressor 120 compresses an incoming flow of air 130. The compressor 120 delivers the compressed flow of air 130 to a combustor 140. The combustor 140 mixes the compressed flow of air 130 with a pressurized flow of fuel 150 and ignites the mixture to create a flow of hot combustion gases 160. Although only a single combustor 140 is shown, the gas turbine engine 110 may include any number of combustors 140 positioned in a circumferential array or otherwise. The flow of combustion gases 160 is in turn delivered to a turbine 170. The flow of combustion gases 160 drives the turbine 170 so as to produce mechanical work. The mechanical work produced in the turbine 170 drives the compressor 120 via a shaft 180 and an external load such as an electrical generator and the like.

The gas turbine engines 105 may use natural gas, various types of syngas, liquid fuels, and/or other types of fuels and blends thereof. The gas turbine engines 105 may be any one of a number of different gas turbine engines offered by General Electric Company of Schenectady, N.Y., including, but not limited to, a frame 7 or a frame 9 series heavy duty gas turbine engine and the like. The gas turbine engines 105 may have many different configurations and may have other types of components. Other types of gas turbine engines also may be used herein. Multiple gas turbine engines, other types of turbines, and other types of power generation equipment also may be used herein together.

The combined cycle system 100 may include one or more heat recovery steam generators 185. In this example, a first heat recovery steam generator 190 and a second heat recovery steam generator 195 are shown although any number may be used. The heat recovery steam generators 185 may recover heat from the hot combustion gases 160 exiting the gas turbine engine 110 so as to create a flow of steam 200. The heat recovery steam generators 185 may be of conventional design and may include one or more pressure sections such as a high pressure section, an intermediate pressure section, and a low pressure section. Each pressure section may include any combination of superheaters, reheaters, evaporators economizers, preheaters, and the like. Other components and other configurations may be used herein.

The combined cycle system 100 also may include one or more steam turbines 210. The steam turbine 210 may be of conventional design and may include one or more pressure sections such as a high pressure section, an intermediate pressure section, and a low pressure section. The flows of steam 200 from the heat recovery steam generators 185 may be expanded in the steam turbine 210 so as to drive an additional load such as an electrical generator and the like. Other components and other configurations may be used herein.

The combined cycle system 100 also may include one or more selective catalyst reduction and/or oxidation catalyst systems 220. In this example, a first selective catalyst reduction and/or oxidation catalyst system 230 may be positioned about the first heat recovery steam generator 190 and a second selective catalyst reduction and/or oxidation catalyst system 235 may be positioned about the second heat recovery steam generator 195. Any number of the selective catalyst reduction and/or oxidation catalyst systems 220 may be used herein. As described above, the selective catalyst reduction and/or oxidation catalyst systems 220 include a catalyst 240 therein so as to react with the combustion gas stream 160. The catalyst 240 may be of conventional design and may be manufactured from suitable carrier and active catalytic components. Different types of catalysts 240 may be used herein. The catalyst 240 may have any suitable size, shape, or configuration. With a selective catalyst reduction system, an ammonia injection grid 250 may be positioned about the catalyst 240 so as to inject a reductant such as ammonia into the combustion gas stream 160. The ammonia injection grid 250 may be in communication with an ammonia source 260 via a piping system to produce an adequate ammonia distribution into the incoming combustion gas stream 160. Other types of reductants may be used herein.

The combined cycle power generation system 100 also may include a catalyst heating system 270 as may be described herein. The catalyst heating system 270 may use one or more extractions 280 of the flow of air 130 in the compressor 120 of the first gas turbine engine 110 to warm the catalyst 240 and the ammonia injection grid 250 of the second selective catalyst reduction system 235 (or vice versa). In this example, a common extraction line 230 may split into a first extraction line 300 in communication with the catalyst 240 and a second extraction line 310 in communication with the ammonia injection grid 250. A control valve 320 may be positioned on the common extraction line 230 or elsewhere. The control valve 320 may be of conventional design. Other types of flow control devices and the like also may be used herein.

Overall control of the catalyst heating system 270 may be governed via a controller 330. The controller 330 may be any type of programmable logic device. The controller 330 may be local or remote. A number of controllers 330 may be used herein. The controller 330 may receive data from a number of sensors in communication with the catalyst heating system 270. These sensors may include a first temperature sensor 340 positioned about the catalyst 240 and a second temperature sensor 350 positioned about the ammonia injection grid 250. Other types of sensors may be used herein. Based upon the data from the sensors and the overall combined cycle controls, the controller 330 may open and close the catalyst heating system 270 via the control valve 320 on the common extraction line 230 or elsewhere. Other components and other configurations may be used herein.

The catalyst heating system 270 thus uses the extractions 280 from the first gas turbine engine 110 to warm the catalyst 240 and the ammonia injection grid 250 of a second selective catalyst reduction and/or oxidation catalyst system 235 in a second heat recovery steam generator 195. The catalyst heating system 270 thus may reduce emissions at start up and shut down of a separate gas turbine engine 105 within the combined cycle system 100 when the catalyst 240 may not have reached the effective temperature range. The controller 330 of the catalyst heating system 270 regulates the flow rate of the extraction 280 via the control valve 320 to achieve the desired exhaust flow temperature of the heat recovery steam generator 185 at the location of the catalyst 240 and the ammonia injection grid 250. The catalyst heating system 270 also may enable lower gas turbine turndown by having the compressor air 130 bypass the combustor 140. The catalyst heating system 270 thus allows the combined cycle system 100 to start up and shut down with lower nitrous oxide and carbon monoxide emissions, lowers annual tonnage of such emissions, lowers hourly and daily levels of such emissions, and lowers gas turbine turndown levels.

It should be apparent that the foregoing relates only to certain embodiments of the present application and the resultant patent. Numerous changes and modifications may be made herein by one of skill in the art without departing from the general spirit and scope of the invention as defined by the following claims and the equivalents thereof.

We claim:

1. A combined cycle system, comprising:
a plurality of gas turbine engines;
a plurality of heat recovery steam generators;
each of the plurality of heat recovery steam generators comprising a selective catalyst reduction and/or oxidation catalyst system at an inlet thereof; and
a catalyst heating system;
wherein the catalyst heating system directs an extraction from a compressor of a first gas turbine engine of the plurality of gas turbine engines to the selective catalyst reduction and/or oxidation catalyst system of a second heat recovery steam generator of the plurality of heat recovery steam generators,
wherein the catalyst heating system comprises an extraction line, the extraction line configured to guide the extraction from the first gas turbine to downstream of the inlet and directly to a catalyst of the selective catalyst reduction and/or oxidation catalyst system of the second heat recovery steam generator.

2. The combined cycle system of claim 1, wherein the catalyst heating system comprises a common extraction line in communication with the extraction from the first gas turbine engine.

3. The combined cycle system of claim 2, wherein the extraction line is a first extraction line in communication with the common extraction line and either the selective catalyst reduction or oxidation catalyst system.

4. The combined cycle system of claim 2, wherein the catalyst heating system comprises a control valve on the common extraction line.

5. The combined cycle system of claim 4, wherein the catalyst heating system comprises a controller in communication with the control valve.

6. The combined cycle system of claim 5, wherein the catalyst heating system comprises a first temperature sensor positioned about the selective catalyst reduction and/or oxidation catalyst system and in communication with the controller.

7. The combined cycle system of claim 5, wherein the selective catalyst reduction system comprises an ammonia injection grid positioned about the catalyst.

8. The combined cycle system of claim 7, wherein the ammonia injection grid is in communication with the extraction.

9. The combined cycle system of claim 7, wherein the catalyst heating system comprises a second temperature sensor positioned about the ammonia injection grid and in communication with the controller.

10. The combined cycle system of claim 7, wherein the catalyst heating system comprises a second extraction line in communication with the common extraction line and the ammonia injection grid.

11. The combined cycle system of claim 1, wherein the plurality of heat recovery steam generators comprises a first heat recovery steam generator in communication with the first gas turbine engine.

12. The combined cycle system of claim 1, wherein the plurality of gas turbine engines comprises a second gas turbine engine in communication with the second heat recovery steam generator.

13. The combined cycle system of claim 1, further comprising a steam turbine downstream of the plurality of heat recovery steam generators.

14. A method of warming a catalyst in a selective catalyst reduction and/or oxidation catalyst system of a combined cycle system, comprising:
compressing a flow of air in a compressor of a first gas turbine engine;
flowing combustion gases from the first gas turbine engine through a first selective catalyst reduction and/or oxidation catalyst system associated with a first heat recovery steam generator;
flowing further combustion gases from a second gas turbine engine through a second selective catalyst reduction and/or oxidation catalyst system associated with a second heat recovery steam generator at an inlet thereof; and
extracting a portion of the flow of air from the compressor of the first gas turbine engine in an extraction line, the extraction line configured to guide the portion of the flow of air from the first gas turbine to downstream of the inlet and directly to a catalyst of the second selective catalyst reduction and/or oxidation catalyst system, in order to warm the catalyst.

15. A combined cycle system, comprising:
a plurality of gas turbine engines;
a plurality of heat recovery steam generators;
each of the plurality of heat recovery steam generators comprising a selective catalyst reduction system with a catalyst and an ammonia injection grid at an inlet thereof; and
a catalyst heating system;
wherein the catalyst heating system directs an extraction from a compressor of a first gas turbine engine of the plurality of gas turbine engines to the catalyst and the ammonia injection grid of a second heat recovery steam generator of the plurality of heat recovery steam generators, and
wherein the catalyst heating system comprises an extraction line, the extraction line configured to guide the extraction from the first gas turbine to downstream of the inlet and directly to the catalyst of the selective catalyst reduction of the second heat recovery steam generator.

16. The combined cycle system of claim 15, wherein the catalyst heating system comprises a common extraction line in communication with the extraction from the first gas turbine engine and with a control valve thereon.

17. The combined cycle system of claim 16, wherein the catalyst heating system comprises a controller in communication with the control valve.

18. The combined cycle system of claim 17, wherein the catalyst heating system comprises a first temperature sensor positioned about the catalyst and in communication with the controller.

19. The combined cycle system of claim 17, wherein the catalyst heating system comprises a second temperature sensor positioned about the ammonia injection grid and in communication with the controller.

* * * * *